United States Patent
Huang et al.

(10) Patent No.: US 10,169,558 B2
(45) Date of Patent: Jan. 1, 2019

(54) ENHANCING BIOMETRIC SECURITY OF A SYSTEM

(75) Inventors: Zuo Huang, Shanghai (CN); Qunzhong Zhang, Shanghai (CN); Kai Gui, Shanghai (CN); Tobias M. Kohlenberg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/381,267

(22) PCT Filed: Sep. 30, 2009

(86) PCT No.: PCT/CN2009/001114
§ 371 (c)(1),
(2), (4) Date: Mar. 19, 2012

(87) PCT Pub. No.: WO2011/038533
PCT Pub. Date: Apr. 7, 2011

(65) Prior Publication Data
US 2012/0174214 A1    Jul. 5, 2012

(51) Int. Cl.
*G06F 21/32*    (2013.01)
*G06F 12/14*    (2006.01)

(52) U.S. Cl.
CPC ...... *G06F 21/32* (2013.01); *G06F 2221/2127* (2013.01)

(58) Field of Classification Search
CPC .......................... G06F 21/32; G06F 2221/2127
USPC ....................... 726/17, 19, 21; 380/247–250; 713/168–181
See application file for complete search history.

(56) References Cited

U.S. PATENT DOCUMENTS

| | | | |
|---|---|---|---|
| 6,393,139 B1 | 5/2002 | Lin et al. | |
| 2002/0035542 A1* | 3/2002 | Tumey et al. | 705/44 |
| 2002/0109677 A1* | 8/2002 | Taylor | G06F 3/0233 345/173 |
| 2002/0181747 A1 | 12/2002 | Topping | |

(Continued)

FOREIGN PATENT DOCUMENTS

| | | |
|---|---|---|
| CN | 1392475 A | 1/2003 |
| CN | 1758265 A | 4/2006 |

(Continued)

OTHER PUBLICATIONS

Patent Cooperation Treaty, PCT International Search Report and Written Opinion of the International Searching Authority dated Jul. 1, 2010 in International application No. PCT/CN2009/001114, 10 pages.

(Continued)

*Primary Examiner* — Jeffrey L Williams
*Assistant Examiner* — Suman Debnath
(74) *Attorney, Agent, or Firm* — Trop, Pruner & Hu, P.C.

(57) ABSTRACT

In one embodiment, a method includes receiving an ordered sequence of biometric inputs from a user via a biometric sensor, determining if each of the ordered sequence matches a corresponding entry stored in a table that includes a stored ordered sequence of biometric inputs corresponding to a password pattern of the user, and if so, enabling the user to access the processing system, otherwise preventing the user from accessing the processing system. Other embodiments are described and claimed.

15 Claims, 7 Drawing Sheets

(56) References Cited

U.S. PATENT DOCUMENTS

| | | |
|---|---|---|
| 2003/0152253 A1 | 8/2003 | Wong |
| 2004/0039998 A1 | 5/2004 | Lee |
| 2004/0091138 A1 | 5/2004 | Lee |
| 2005/0021960 A1* | 1/2005 | McKeeth ............... G06F 21/31 713/170 |
| 2007/0140530 A1 | 6/2007 | Coogan et al. |
| 2007/0261118 A1 | 11/2007 | Lu |
| 2007/0276805 A1 | 11/2007 | Huang |
| 2008/0205714 A1* | 8/2008 | Benkley ............. G06F 3/03547 382/126 |
| 2008/0222422 A1* | 9/2008 | Cheng et al. ................ 713/176 |
| 2008/0229400 A1 | 9/2008 | Burke |
| 2009/0028395 A1 | 1/2009 | Riionheimo |
| 2009/0083850 A1 | 3/2009 | Fadell et al. |
| 2009/0143104 A1* | 6/2009 | Loh ....................... G06Q 20/32 455/558 |
| 2010/0027045 A1* | 2/2010 | Moore ......................... 358/1.14 |
| 2010/0169958 A1* | 7/2010 | Werner et al. .................... 726/6 |
| 2010/0185871 A1* | 7/2010 | Scherrer et al. ............. 713/186 |
| 2010/0222095 A1 | 9/2010 | Yamashita et al. |

FOREIGN PATENT DOCUMENTS

| | | |
|---|---|---|
| CN | 101261679 A | 9/2008 |
| CN | 101379458 A | 3/2009 |
| CN | 101436935 A | 5/2009 |
| CN | 101261679 A | 10/2009 |
| EP | 1418486 | 5/2004 |
| JP | S63-000661 | 5/1988 |
| JP | 10-154231 | 11/1996 |
| JP | 2001-274897 | 10/2001 |
| JP | 2003-323412 | 11/2003 |
| JP | 2004-272892 | 9/2004 |
| JP | 2007-026011 | 7/2005 |
| JP | 2007-189395 | 7/2007 |
| JP | 2007-193476 | 8/2007 |
| JP | 2007-228562 | 9/2007 |
| JP | 2007-304646 | 11/2007 |
| JP | 2007-310639 | 11/2007 |
| KR | 10-2004-0039998 | 5/2004 |
| RU | 2338258 C2 | 11/2008 |
| RU | 2369025 C2 | 9/2009 |
| WO | WO 2007/023756 | 3/2007 |

OTHER PUBLICATIONS

U.S. Appl. No. 61/145,069, entitled "System and Method to Provide Secure Access to Personal Information", filed Jan. 15, 2009 by Jeff Scherrer.

TechRepublic; "Screenshots: Google's Android Comes to Life"; May 29, 2008; 4 pages.

Japanese Patent and Trademark Office, Office Action dated Dec. 4, 2012 in Japanese application No. 2012-531205.

Japanese Patent and Trademark Office, Decision of Refusal dated May 14, 2013 in Japanese application No. 2012-531205.

Chinese Patent Office, Office Action dated Feb. 16, 2015, in Chinese Patent Application No. 200980161704.4.

Intellectual Property Office of Singapore, Examination Report dated Feb. 14, 2014 in Singapore application No. 201202081-4.

Japanese Patent Office, Office Action dated May 7, 2014 in Japanese Application No. 2013-190449.

Russian Patent Office, Official Decision of Grant dated May 13, 2014 in Russian application No. 2012117895.

Chinese Patent Office, Office Action dated Jul. 2, 2014, in Chinese Application No. 200980161704.4.

Korean Patent Office, Office Action dated Jul. 31, 2014, in Korean Application No. 2012-7011043.

Intellectual Property Office of Singapore, Written Opinion dated Jun. 13, 2013 in Singapore application No. 201202081-4.

Machine Translation of Chinese application No. 200810236804, filed on Dec. 10, 2008.

Machine Translation of Chinese application No. 200810068525, filed on Mar. 31, 2008.

Russian Patent Office, Official Action dated Oct. 24, 2013 in Russian application No. 2012117895.

Korean Patent Office, Office Action dated Dec. 27, 2013 in Korean application No. 2012-7011043.

Chinese Patent Office, Office Action dated Jun. 11, 2015, in Chinese Patent Application No. 200980161704.4.

China Patent Office, Fourth Office Action dated Sep. 14, 2015 in Chinese Patent Application No. 200980161704.4.

Japan Patent Office, Notice of Rejection dated Oct. 27, 2015 in Japanese Patent Application No. 2013-190449.

State Intellectual Property Office, P.R. China, Decision of Rejection dated Feb. 3, 2016, in Chinese Patent Application No. 200980161704.4.

State Intellectual Property of The People's Republic of China, Fifth Office Action dated Jan. 18, 2017 in Chinese Patent Application No. 200980161704.4.

Intellectual Property India, Examination Report dated May 22, 2018 in Indian Patent Application No. 2618/DELNP/2012.

European Patent Office, Extended European Search Report dated Oct. 28, 2013 in European Patent Application No. 09849941.1.

\* cited by examiner

ENHANCING BIOMETRIC SECURITY OF A SYSTEM

BACKGROUND

As users of processor-based systems place increasing reliance on their systems and the data stored in such systems, security concerns increase. To provide security for such systems, oftentimes passwords are established and used to protect access to the system generally. Additional passwords can be used to protect access to particular applications, files, and interaction with remote sources such as websites accessible by the system. Still further, security can be provided by encryption of files and data.

However, with the various uses of a system, a user can be faced with an increasing number of passwords, which can lead to loss or confusion. Accordingly, some users select a common password for many different types of applications, which can greatly compromise security.

Some systems provide additional security by way of some type of biometric sensor. For example, many processor-based devices are equipped with a fingerprint sensor that acts as an identification apparatus. However, a user simply places/slides (in any moving direction) a single finger one time on the sensor, and the device performs an identification process. For many purposes, however, this kind of security mechanism is not strong enough.

DETAILED DESCRIPTION

Embodiments provide an enhanced secure identification process, e.g., for systems having a biometric sensor such as a fingerprint sensor. To perform identification in accordance with an embodiment of the present invention, a user may place different digits (e.g., fingers or toes) in a predetermined sequence or order on a sensor. In some implementations, the user may slide a digit in different directions to make the scanning sequence different, even when using the same finger. In this way, identification is more robust than a single input style, as even if a malicious person sees which finger a user places on the sensor, he may not be aware of the order and the sliding direction for the specific finger, and thus will not learn the password.

In different implementations, an ordered sequence of different digits (with or without direction of movement) can form a password, also referred to herein as a password pattern. Note that in some implementations, the password pattern may not include any alphanumeric characters and instead corresponds solely to the sequence of digits/movements. In other implementations, different manners of mapping biometric information and/or user movements to elements (e.g., alphanumeric values) of a password can be realized. While the scope of the present invention is not limited in this regard, in some implementations a user's digits each may map to a numeric code such that the ten fingers map to the numbers 0-9.

In one embodiment, an ordered sequence of fingerprints of different digits may be used to represent a pure numerical password. In this way, existing numerical (and/or alphanumeric) passwords can be converted to a fingerprint sequence unique to a specific user. In this way, previously generated passwords can be converted into biometric-based passwords to improve security robustness. However, as described above in other implementations a sequence of fingers and movements may itself form a sequenced password without a separate mapping to keyboard characters.

Figure 1:
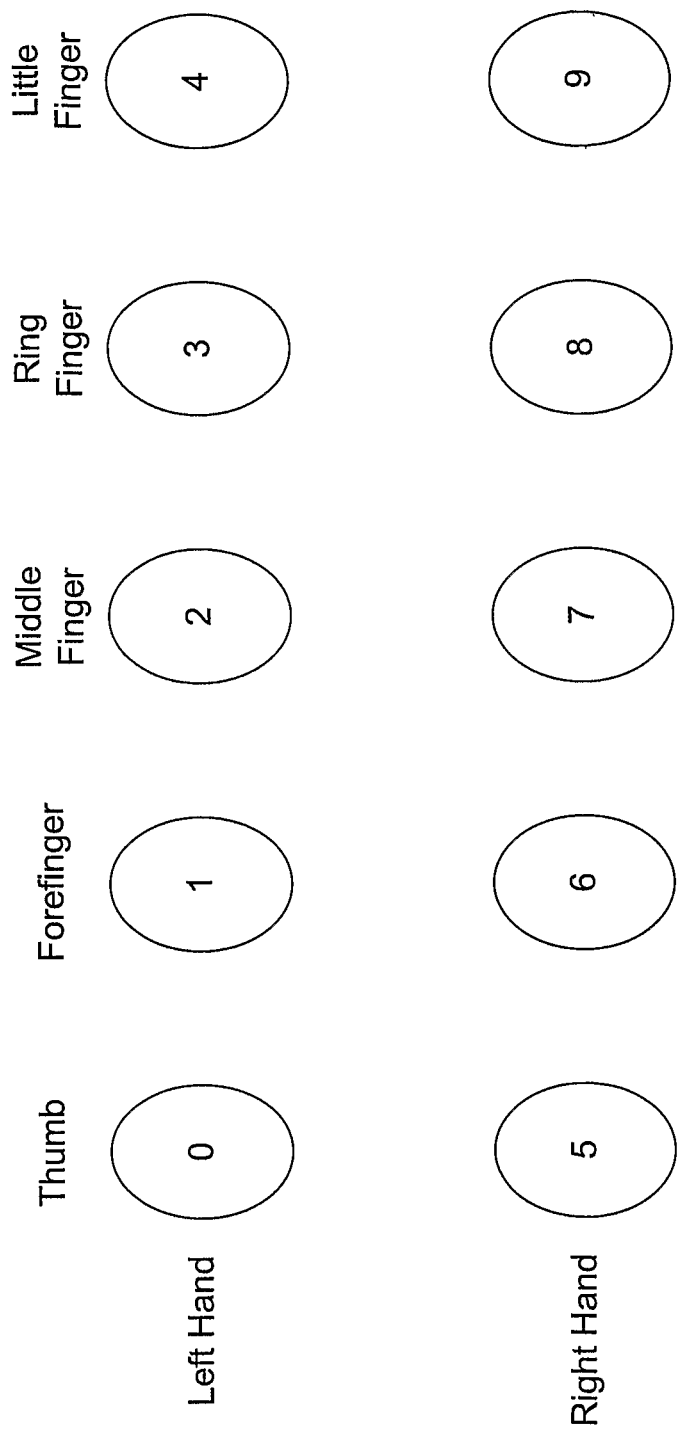
FIG. 1 is a diagram representing an illustrative mapping of digits in accordance with one embodiment of the present invention.

FIG. 1 is a diagram representing an illustrative mapping in accordance with one embodiment of the present invention. In the embodiment of FIG. 1, the fingerprint for each digit of both left and right hands represents a number from 0-9. While this is one example of mapping, a user could use any representation for each fingerprint which is unique to him/her only. In this way, embodiments provide a stronger physical encryption for a password, as the same password (e.g., 01234) will have different ordered sequences for different users (e.g., corresponding to the different user's fingerprints). For example in one implementation, with mapping of individual elements of a password for different digits, a password of 0123 may map to an identification profile of a single sequence of the fingerprints of thumb, forefinger, middle finger, and ring finger on the left hand, as seen in FIG. 1.

In other implementations, a combination of digit and user movement may map to a corresponding element. For example, a thumb print and movement in a given direction (e.g., left to right or up to down) may map to a given number or other character. In some implementations, a user may select the desired mappings, while in other embodiments the mappings may be preset by the system. Using a combination of digits and movement directions (e.g., two directions per digit), 20 characters can be obtained.

In an implementation in which a combination of digit and movement maps to a value, one example mapping may be as follows: a thumb slide up to down and down to up may map to 0 and 1 (respectively); forefinger slide up to down and down to up may map to 2 and 3 (respectively); and a middle finger up to down and down to up represents 4 and 5 (respectively). Of course, a user could use different fingers to represent different elements.

Figure 2:
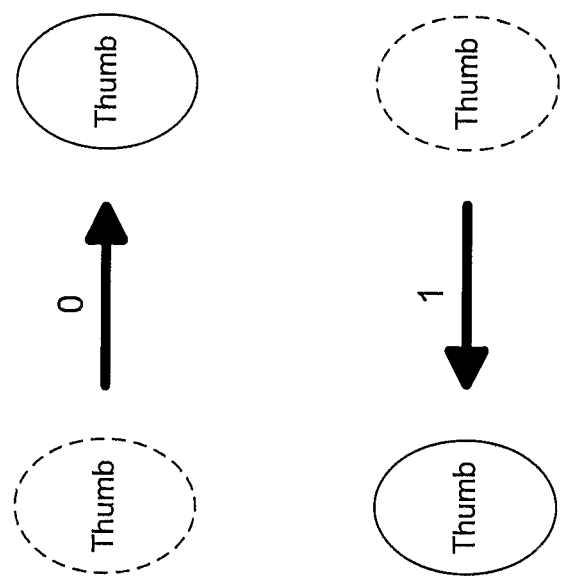
FIG. 2 is a diagram that shows both digit and movement direction mapping to a password element in accordance with one embodiment of the present invention.

In the implementation of FIG. 2, a mapping is performed that maps both digit and movement direction to a password element. As seen in FIG. 2, the user presses the thumb on the sensor and slides from left to right for a zero value password element, while movement from right to left stands for a one value password element. In this example a password of 01010 can be represented by moving thumb on sensor as (starting at) left, right, left, right, left and right. Other fingers and/or other movements can map to different numbers, or even more specific meanings which is unique to different users. For example, if a user speaks American Sign Language he or she can choose to use a set of fingers and directions that "spell" something meaningful to the user. In general, a user can choose any finger gesture from any language and use that to create specific, easily memorable patterns that are unique to the user. Software or firmware considers the shape and the size of sensor surface, and can give a user a different guide to set the password. In one implementation, a system may present the user with a musical instrument layout that enables input of a combination of fingerprints and chords or sequences. Or a mapping can be realized by displaying a dial from a combination lock and tracking the number to which the dial is turned, and which fingers (and how many fingers) are used to turn the dial. In yet another implementation, in which a biometric sensor has a three dimensional (3D) feature, motions that slide across the 3D surface can map to a display, e.g., of a Rubik's™ cube or other design.

Figure 3:
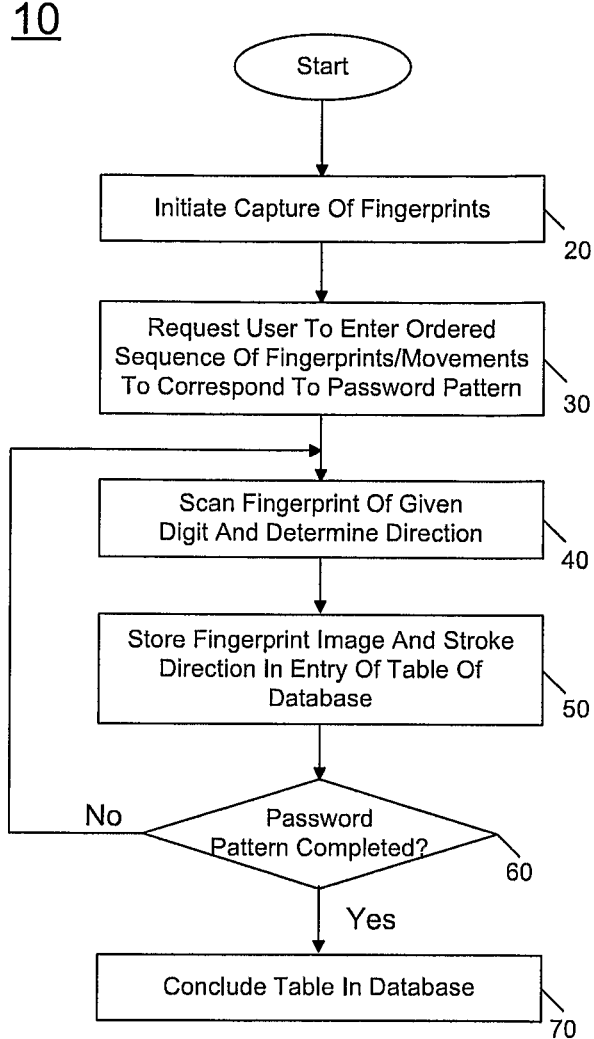
FIG. 3 is a flow diagram of a method for generating a password in accordance with one embodiment of the present invention.

Referring now to FIG. 3, shown is a flow diagram of a method in accordance with one embodiment of the present invention. As shown in FIG. 3, method 10 may be used to map a user's fingerprints and direction of movement or stroke to enable generation of a password pattern. As shown in FIG. 3, the method may begin by initiating capture of fingerprints one-by-one (block 20). For example, a system may initiate a fingerprint acquisition module to cause a biometric sensor to receive finger inputs. In one embodiment, screen displays may be provided to guide the user through entry of different fingers and movement directions. Specifically, as seen in FIG. 3 at block 30, the system may request the user to enter an ordered sequence of fingerprints/movements that correspond to a password pattern. The system may then scan the fingerprint of a given digit and determine its direction of movement (block 40). For example, a first element of the password pattern may correspond to a left index finger as it is moved across the biometric sensor from up to down. Responsive to this input, the system may store the fingerprint image and stroke direction in an entry of a table of a database (block 50). In one embodiment, the direction may be stored as metadata that notes the direction in which the scan occurred. For example, this combination of fingerprint image and stroke direction may be entered into a first entry of a table that is to store a password pattern for this particular user, and which itself may be part of a database of user passwords stored in the system.

Referring still to FIG. 3, at diamond 60 it may be determined whether the password pattern has been completed (diamond 60). If not, control passes back to blocks 40 and so on for further acquisition of fingerprint/direction scanning and storage. Note that the table may thus include multiple entries each to store a corresponding fingerprint image and stroke direction. Otherwise, control passes to block 70 where the table in the database may be concluded. Accordingly, FIG. 3 shows a method to acquire a user's fingerprint images and directions of movement that correspond to an ordered sequence of a password pattern. Note that in this embodiment there is no need to map these images/movements to the characters available via a keyboard, as instead the password pattern may be a completely physical code, combining specific user fingerprints and directions of movement entered.

Figure 4:
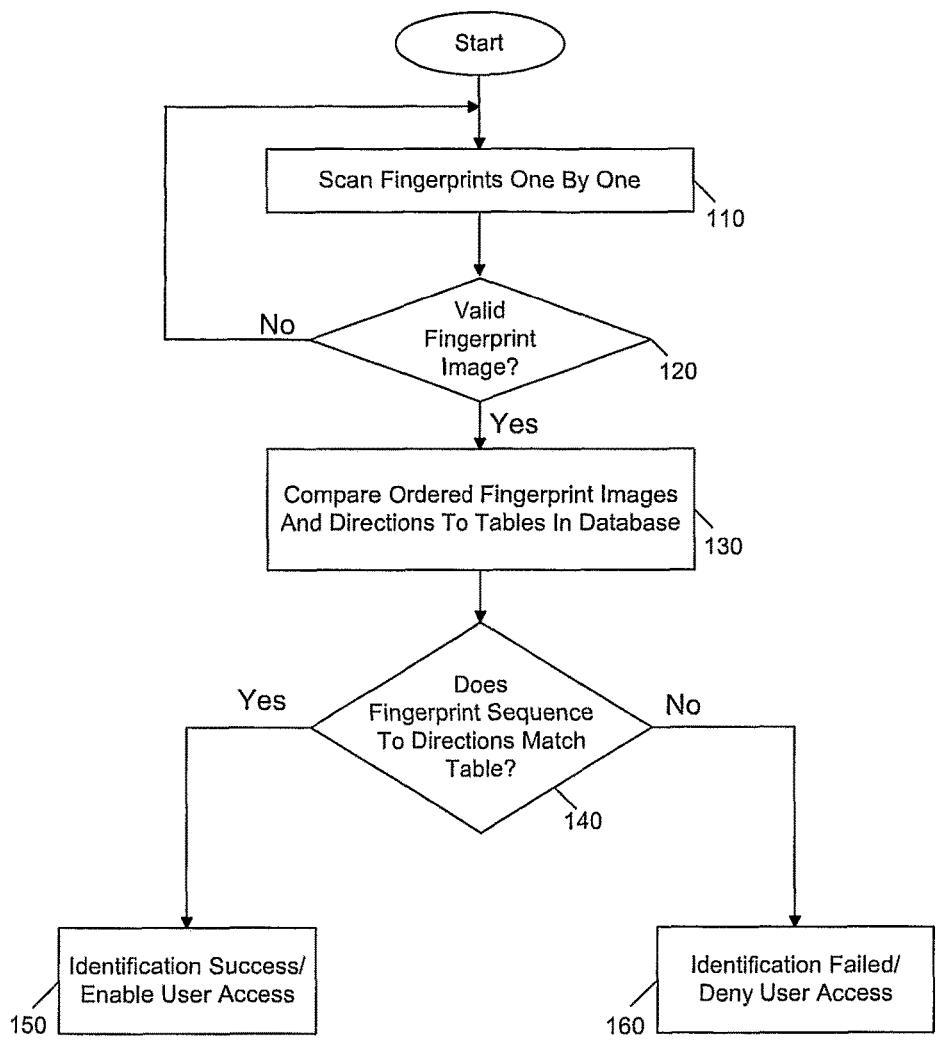
FIG. 4 is a flow diagram of a method for password authentication in accordance with one embodiment of the present invention.

To enable a user to access a system in which he/she has one or more stored password patterns, a method such as described with regard to FIG. 4 may be used. Referring now to FIG. 4, shown is a flow diagram of a method for password authentication in accordance with one embodiment of the present invention. As shown in FIG. 4, method 100 may begin by scanning fingerprints one by one (block 110). Such scanning may be performed by the user entering the specific order of fingers/directions as was done for the password pattern generation discussed above regarding FIG. 3. For each input, it may be determined whether a valid fingerprint is obtained (diamond 120). If so, control passes to block 130. Otherwise control passes back to block 110 to seek re-entry of the corresponding fingerprint. In some implementations, the system may provide information to the user as to whether each input was sensed correctly and can request a re-input as needed. Note that in some embodiments, all fingerprints/directions may be scanned prior to proceeding to block 130. In some embodiments, a user input may indicate when the user has completed the input, and which also may be user-selected.

Upon receipt of the fingerprint/directions, the scans/movements may be compared to tables in a database (block 130), where each table corresponds to a stored password pattern for a user. More specifically, in one implementation the first scan/movement direction input may be compared to the first entry in each table to determine if a match exists. The comparison/determination of block 130 and diamond 140 may proceed in seriatim until a full password pattern is detected that fully matches the scans/movements stored in a table. Next, control passes to diamond 140, where it may be determined whether the fingerprint sequence and direction matches a table in the database. If a complete match is identified, the identification process has been successfully completed, and user access is enabled (diamond 150). Otherwise, control passes to block 160, where the access can be denied. Note that the access may be to a system generally, or to a specific application, file or so forth While shown with this particular implementation in the embodiment of FIG. 4, the scope of the present invention is not limited in this regard.

Figure 5:
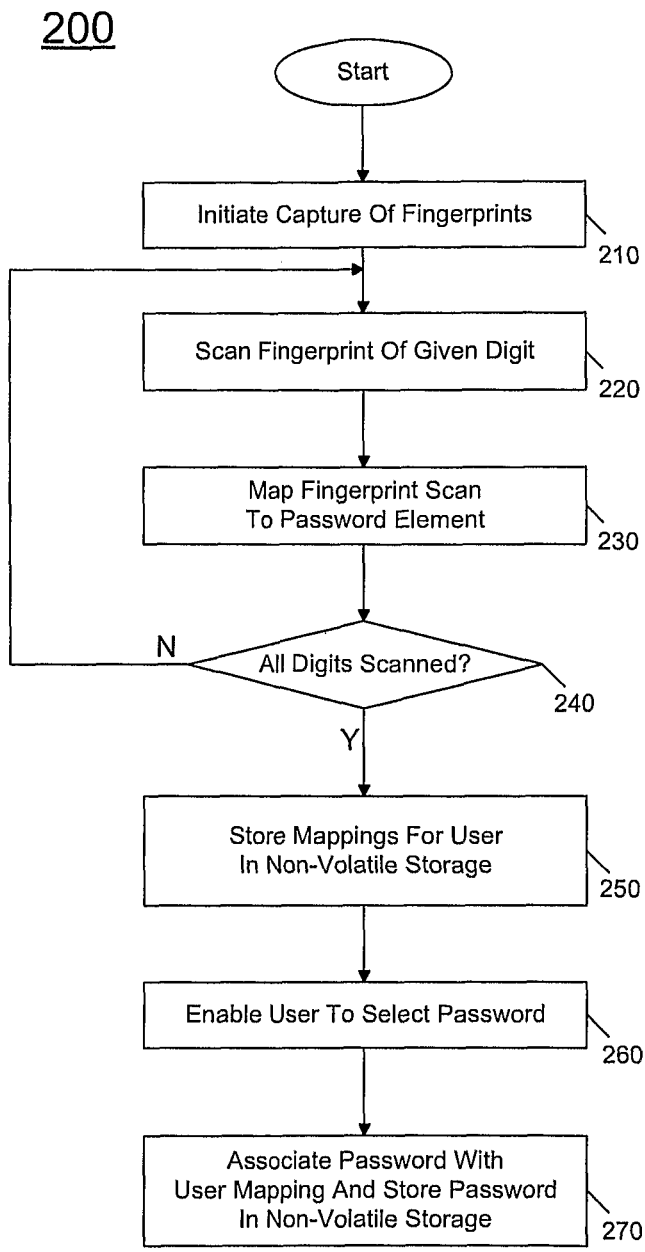
FIG. 5 is a flow diagram of a method for generating a password in accordance with an embodiment of the present invention.

As discussed above, in other implementations a user's entry of a fingerprint scan (with or without direction) may be mapped to characters, e.g., alphanumeric characters of a keyboard. Accordingly, the embodiments for password creation and authentication discussed above with regard to FIGS. 3 and 4 may be altered to accommodate such mappings. Referring now to FIG. 5, shown is another embodiment of a method for generating a password in accordance with an embodiment of the present invention. As shown in FIG. 5, method 200 may be used to generate a password. In general the method proceeds as discussed above regarding FIG. 3. Specifically, an initiation of fingerprint capture may be performed (block 210). Then a scan of a fingerprint may occur, with or without capture of direction metadata (block 220). Then this fingerprint scan may be mapped to a password element (block 230). In one embodiment, this mapping between a password element (e.g., an alphanumeric character) and a fingerprint scan/direction form an entry to be stored in a database table, i.e., each entry of the table may include a corresponding scan, character, and (possibly) scan direction. Either the user may select the password element or the computer may do so. Control then passes to diamond 240 where it may be determined whether all digits have been scanned. If not, control passes back to block 220 discussed above.

Referring still to FIG. 5, when a complete number of digits has been scanned in, the mappings may be stored for the user in a non-volatile storage (block 250). For example, a table including multiple entries each corresponding to a given scan (with or without direction) and the corresponding mapping to a character may be stored.

In one embodiment, the system may then allow the user to enable selection of a password (block 260) such that each finger (with or without direction) maps to a different character element of a password. In one embodiment, this mapping may be via an index to a location of the entry of the database table for the user for the corresponding character, i.e., each entry of the password table may store a character and index to the location of the database table for this character. Accordingly, this password may be associated with the user mapping and stored, e.g., in a password table of the non-volatile storage (block 270). While shown with this particular implementation in the embodiment of FIG. 5, the scope of the present invention is not limited in this regard.

Figure 6:
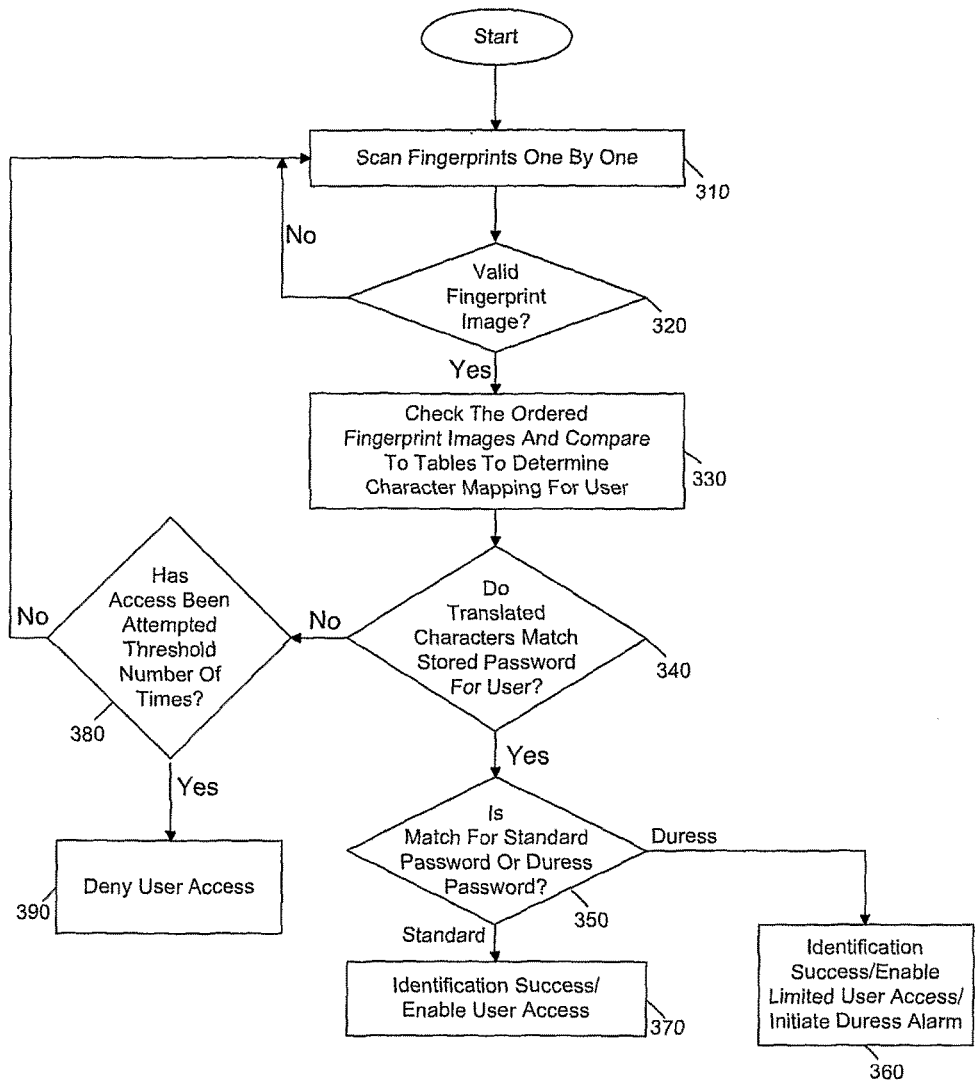
FIG. 6 is a flow diagram of a method for password authentication in accordance with another embodiment of the present invention.

Similarly, an authentication method may take account of such mappings. Referring now to FIG. 6, shown is a flow diagram of a method for authentication in accordance with another embodiment of the present invention. As shown in FIG. 6, method 300 may begin as discussed above regarding FIG. 4. Specifically, multiple fingerprints may be scanned one at a time (block 310) and it may be determined whether each such image is valid (diamond 320). Then, each ordered fingerprint image may be checked against a database of tables (each for a user and including entries for mapping of scans/directions to characters) and translated based on the mapping stored in the non-volatile storage (block 330). The above steps may be performed for each user input scan. Then it may be determined whether the translated characters match a stored password for the user present in a password database (diamond 340). If not, it may be determined whether access has been attempted a threshold number of times (diamond 380). If not, the fingerprints may be re-scanned. If access has been attempted the threshold number of times, control passes to block 390 where user access may be denied.

If the translated characters do match a password at diamond 340, it may next be determined whether it is a match for a standard password or a duress password (diamond 350). That is, some embodiments may enable detection of an alternate password, namely a duress password entered when a user is under duress that may enable minimal access to a system and/or enable a signal to a third party to warn of the duress. In these embodiments, a user may enter a password with an altered pattern under duress, and the system responds differently. The system can recognize the entry as a panic password and may give limited (or no) access to the system, and/or cause a duress alert to be sent.

If the standard password matches in the determination at diamond 350, control passes to block 370, where the identification is a success and user access, i.e., normal user access is enabled. If instead the match is for a duress password, control may pass to block 360, where the identification success may lead to a possibly limited user access (or no access) and initiation of a duress alarm.

Note that the method of FIG. 6 may also be used to receive biometric user input for a password previously stored as a pure alphanumeric password, enabling backwards compatibility to improve robustness. While shown with this particular implementation in the embodiments of FIGS. 5 and 6, it is to be understood that the scope of the present invention is not limited in this regard and as discussed above, fingerprint scans with or without directions of motion may themselves form a password without a translation or mapping to characters.

Many variations are possible. For example, in some implementations biometric authentication can be used as a way to perform secure input of (e.g., alphanumeric) characters to enter information other than a password directly to a computer without having to use a keyboard. Thus for a user in a public place, information such as credit information can be entered without typing on a keyboard to thus enable a secure way to enter information.

As more discrete elements are included in a password, the strength of the authentication is increased. In some implementations, a differing number of password elements can be used to provide varying levels of access to a system or information/applications on the system. For example, for unlocking a mobile phone to make a phone call, a single slide of a single finger can unlock it to give access to the phone function. If however, for a financial transaction where access to personal information (e.g., credit card information) is desired, instead of using just a single digit, multiple digits/directions (e.g., three fingers) can be required. In this way, gradations of authentication can be realized.

In one example, a single password pattern may be a first number of elements (e.g., 20). Different portions of the password (e.g., beginning from the first element) may be used for different authentication levels. For example, only one element may be used to obtain access to the device, five elements used for accessing one type of application, and yet additional elements to access secure applications and so forth. Other embodiments may allow use of a N of M password. In such implementations, authentication requires at least N elements of an M element password, for example, three of ten or three of five, or so forth. When used with an embodiment, the N of M may be implemented by specifying a pattern swipe and number of fingers that must be used, and making the actual fingers used irrelevant. For example, an authentication policy may be to receive at least three different fingers each with a pattern of movements. Other implementations may require multiple fingers on both hands.

There are so many passwords in daily life, and some people always forget the passwords, causing much inconvenience. Using an embodiment of the invention, people could even write down their passwords in a notebook without concern for compromise, as without the physical combination of fingers and movements, the entry of a password alone will not allow access.

Embodiments may be incorporated in many different processing systems. For example, embodiments may be used in connection with computers ranging from notebooks, desktops, to server computers, as well as mobile Internet devices, smart phones and so forth. Any such processing system may include or be associated with a biometric sensor, which may be configured into the system or adapted to the system, e.g., as a peripheral device such as via a universal serial bus (USB) port. In some implementations, rather than a dedicated biometric sensor, a biometric sensing function can be realized via a combination of a touch screen (such as a capacitive sensing touch screen) and software, firmware and/or logic to convert actions on the touch screen to biometric scans.

Figure 7:
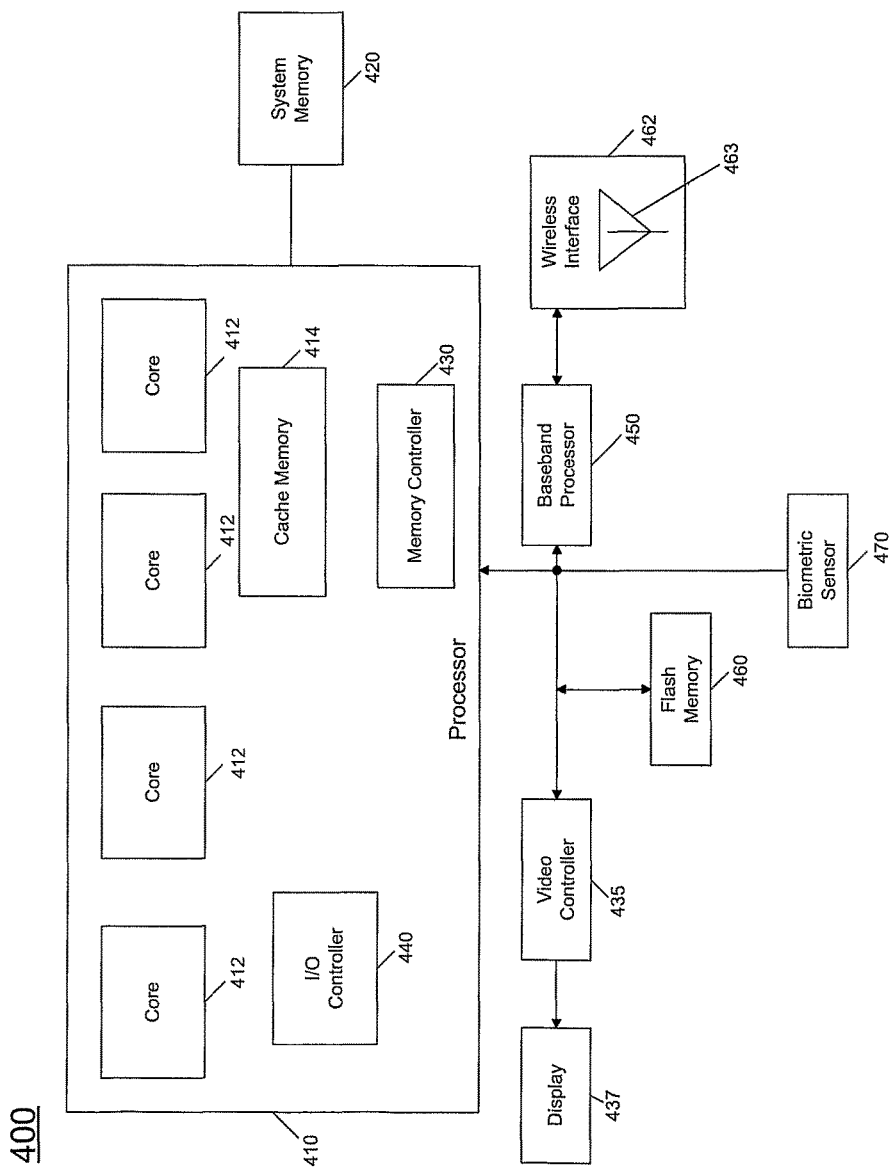
FIG. 7 is a block diagram of a system for use with one embodiment of the invention.

FIG. 7 is a block diagram of a system for use with one embodiment of the invention. In one embodiment, processing system 400 may be a mobile Internet device such as a smart phone, although embodiments can be incorporated in many different processing systems. As seen, system 400 includes an applications processor 410, which may be a general-purpose or special-purpose processor such as a microprocessor, microcontroller, a programmable gate array (PGA), or the like. Processor 410 may include a plurality of cores 412 and a cache memory 414. Processor 410 may further include an integrated memory controller 430, which in one embodiment, which may be coupled to a system memory 420 (e.g., a dynamic random access memory (DRAM)). Processor 410 may further include an integrated input/output (I/O) controller hub 440. Processor 410 may be coupled to a video controller 435, which in turn may be coupled to a display 437, which may include a capacitance touch screen to receive user input.

A flash memory 460 may provide for non-volatile storage which may include a password table including biometric-based entries for one or more users of the system, and which can be used for comparison to receipt of biometric inputs from a user seeking access. In addition, a baseband processor 450 may control communications via a wireless interface 462, which may be used to communicate via cellular or other wireless networks.

Additionally, a biometric sensor 470 may be present in the system to enable fingerprint or other scanning to provide security for the system in accordance with an embodiment of the present invention. While shown as a separate component in the embodiment of FIG. 7, understand that in other implementations biometric sensor 470 may be configured within a display. Although the description makes reference to specific components of system 400, it is contemplated that numerous modifications and variations of the described and illustrated embodiments may be possible.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving an ordered sequence of biometric inputs from a user via a biometric sensor associated with a processing system, wherein each biometric input of the ordered sequence of biometric inputs is associated with a corresponding digit of the user;
   determining an indication of a direction of motion of the corresponding digit for each of the biometric inputs while the corresponding digit is being sensed by the biometric sensor;
   determining if the biometric input and direction of motion of each of the ordered sequence of biometric inputs matches a corresponding entry stored in a table of a non-volatile storage of the processing system, the table including a stored ordered sequence of biometric inputs corresponding to a password pattern of the user selected by the user, the table including a plurality of entries each to store, for one of the stored ordered sequence, a biometric input, direction of motion, and mapping to an alphanumeric character;
   if the biometric input and direction of motion of each of the ordered sequence of biometric inputs matches the corresponding entry stored in the table, determining whether a collection of the alphanumeric characters of each entry matches a stored password in a password database;
   if so, enabling the user to access the processing system and converting the stored password to the password pattern, and otherwise preventing the user from accessing the processing system, wherein each of the ordered sequence of biometric inputs maps to an element of the password pattern selected by the user and the stored password is an alphanumeric password previously stored without biometrical-based information.

2. The method of claim 1, further comprising enabling the user to access a limited portion of the processing system when a number of the ordered sequence of biometric inputs is less than a number of the stored ordered sequence of biometric inputs.

3. The method of claim 1, wherein the ordered sequence of biometric inputs is of a first length N and the stored ordered sequence of biometric inputs is of a second length M, wherein N is less than M.

4. The method of claim 1, further comprising enabling the user to access a first function of the processing system responsive to a single biometric input that matches a first one of the stored ordered sequence of biometric inputs.

5. The method of claim 4, further comprising enabling the user to access a second function of the processing system responsive to a plurality of biometric inputs that matches a corresponding plurality of the stored ordered sequence of biometric inputs inputs.

6. The method of claim 5, wherein the second function enables the user to perform a secure financial transaction including account information of the user.

7. The method of claim 1, further comprising presenting a guide set on a display associated with the biometric sensor to enable the user to input the ordered sequence of biometric inputs, wherein the guide set is one of a musical instrument layout and a combination lock representation.

8. The method of claim 1, wherein each of the biometric inputs of the ordered sequence of biometric inputs is a full fingerprint image.

9. At least one non-transitory machine-accessible storage medium including instructions that when executed enable a system to:
   request a user to enter an ordered sequence of biometric inputs via a biometric sensor associated with the system, each biometric input associated with a corresponding digit of the user;
   determine an indication of a respective direction of movement of the corresponding digit with respect to the biometric sensor while being sensed by the biometric sensor for each of the ordered sequence of biometric inputs;
   receive the ordered sequence of biometric inputs in the system from the user via the biometric sensor;
   store a scan of each of the ordered sequence of biometric inputs, metadata regarding the direction of movement, and an alphanumeric character in an entry of a table associated with the user, the table stored in a non-volatile memory;
   enable the user to select a password, and store a mapping of the password to entries of the table, wherein the mapping for an element of the password comprises an index to the entry of the table including the alphanumeric character selected by the user to map to the element;

receive a second ordered sequence of biometric inputs in the system from the user via the biometric sensor;

determine an indication of a respective direction of movement of the corresponding digit with respect to the biometric sensor while being sensed by the biometric sensor for each of the second ordered sequence of biometric inputs; and determine if each of the second ordered sequence of biometric inputs matches a corresponding entry stored in the table, and if so, determine whether a collection of the alphanumeric characters of each entry matches at least a portion of a stored password in a password database;

if so enable the user to access the system and convert the stored password to the second ordered sequence of biometric inputs, otherwise prevent the user from accessing the system, wherein the stored password is an alphanumeric password previously stored without biometrical-based information.

10. The at least one medium of claim 9, further comprising instructions that when executed enable the system to determine if the second ordered sequence of biometric inputs corresponds to a duress password, and if so, to transmit a duress alert to a third party.

11. The at least one medium of claim 9, further comprising instructions that when executed enable the system to determine if each of the second ordered sequence of biometric inputs matches an entry of the table, wherein a number of the second ordered sequence of biometric inputs is less than a number of the ordered sequence of biometric inputs.

12. The at least one medium of claim 9, wherein each of the biometric inputs of the ordered sequence of biometric inputs is a full fingerprint image.

13. A system comprising:

a processor to execute instructions to receive an ordered sequence of biometric inputs from a user, determine if each of the ordered sequence of biometric inputs and associated direction of motion matches a corresponding entry stored in a table including a stored ordered sequence of biometric inputs corresponding to a password pattern for the user, and if so, identify a collection of alphanumeric characters, wherein each alphanumeric character of the collection is associated with a table entry corresponding to one of the ordered sequence of biometric inputs, determine whether the collection of alphanumeric characters matches at least a portion of a stored password in a password database, wherein the stored password is an alphanumeric password previously stored without biometrical-based information, and convert the stored password to the user-selected password pattern;

a biometric sensor coupled to the processor to provide the ordered sequence of biometric inputs to the processor;

logic to determine an indication of a movement direction of a corresponding digit of the user while the corresponding digit is being sensed by the biometric sensor for each of the ordered sequence of biometric inputs; and a non-volatile memory coupled to the processor, the non-volatile memory to store the table, wherein each entry in the table further comprises a mapping corresponding one of the stored ordered sequence of biometric inputs with an alphanumeric character, and the non-volatile memory further to store a password database having a plurality of entries each corresponding to a password for the user and including a mapping of the password to entries of the table, wherein the mapping for an element of the password comprises an index to the entry of the table including the alphanumeric character of the password element.

14. The system of claim 13, wherein each entry in the table further comprises a mapping corresponding a respective one of the stored ordered sequence of biometric inputs with the corresponding movement direction of the corresponding digit of the user while the corresponding digit is being sensed by the biometric sensor.

15. The system of claim 13, wherein each of the biometric inputs of the ordered sequence of biometric inputs is a full fingerprint image.

* * * * *